United States Patent
Yong et al.

(10) Patent No.: US 8,679,375 B2
(45) Date of Patent: Mar. 25, 2014

(54) CARBON BLACKS-FREE SULFUR-VULCANISED ELECTRICALLY CONDUCTIVE RUBBER BLENDS

(75) Inventors: Kok Chong Yong, Kuala Lumpur (MY); Che Su Mt Saad, Kuala Lumpur (MY)

(73) Assignee: Malaysian Rubber Board, Kuala Lumpur (MY)

( * ) Notice: Subject to any disclaimer, the term of this patent is extended or adjusted under 35 U.S.C. 154(b) by 0 days.

(21) Appl. No.: 13/542,251

(22) Filed: Jul. 5, 2012

(65) Prior Publication Data

US 2012/0286213 A1   Nov. 15, 2012

Related U.S. Application Data

(63) Continuation-in-part of application No. 12/760,239, filed on Apr. 14, 2010, now Pat. No. 8,470,210.

(30) Foreign Application Priority Data

Jun. 22, 2009   (MY) ................................ PI20092620

(51) Int. Cl.
*H01B 1/12*   (2006.01)

(52) U.S. Cl.
USPC ...................... 252/519.4; 252/500; 252/519.5; 252/519.33; 252/519.34; 252/521.6

(58) Field of Classification Search
USPC ......... 252/519.4, 500, 519.5, 519.33, 519.34, 252/521.6
See application file for complete search history.

(56) References Cited

U.S. PATENT DOCUMENTS

| | | | | |
|---|---|---|---|---|
| 5,917,693 | A * | 6/1999 | Kono et al. | 361/525 |
| 7,351,359 | B2 | 4/2008 | Maruyama et al. | |
| 8,470,210 | B2 * | 6/2013 | Yong et al. | 252/519.34 |
| 2005/0062020 | A1 * | 3/2005 | Abe | 252/500 |
| 2009/0242842 | A1 * | 10/2009 | Suh et al. | 252/500 |
| 2010/0301278 | A1 * | 12/2010 | Hirai et al. | 252/502 |
| 2010/0320427 | A1 * | 12/2010 | Yong et al. | 252/519.33 |

OTHER PUBLICATIONS

U.S. Appl. No. 12/760,239, filed Apr. 14, 2010, Yong et al.
K.C. Yong, et al "Conductive poly(butadiene-co-acrylonitrile)-polyaniline dodecylbenzenesulfonate [NBR-PAni.DBSA] blends prepared in solution" European Polymer Journal, vol. 42, Issue 8, Aug. 2006, pp. 1716-1727.
U.S. Appl. No. 12/760,239, May 17, 2012, Restriction Requirement.

* cited by examiner

*Primary Examiner* — Douglas McGinty
(74) *Attorney, Agent, or Firm* — Workman Nydegger

(57) ABSTRACT

A practical and environmentally-friendly method, i.e. the high temperature-mechanical mixing by using an internal mixing device and a two-roll open milling device is used to produce the carbon blacks-free electrically conductive sulfur-vulcanised rubber blends of solid poly(butadiene-co-acrylonitrile) and solid sulfonic acid doped polyaniline. The addition of sulfur vulcanization system does not affect the electrical properties of the vulcanised blends. All vulcanised blends prepared by using this method show useful electrical conductivities up to the order of $10^{-2}$ S/cm, good tensile strengths up to 18.0 MPa and colorable with the addition of a whitening agent. As a result, they have good potential to be used for manufacturing any antistatic products, electrostatic discharge or dissipative products and electromagnetic or radio frequency interferences shielding products.

10 Claims, 3 Drawing Sheets

With x >1.0; y <1.0

BD = Butadiene

ND STATES PATENT

CARBON BLACKS-FREE SULFUR-VULCANISED ELECTRICALLY CONDUCTIVE RUBBER BLENDS

CROSS-REFERENCE TO RELATED APPLICATIONS

This application is a continuation-in-part of U.S. application Ser. No. 12/760,239 filed on 14 Apr. 2010, now U.S. Pat. No. 8,470,210, which claims priority to Malaysian Application No. PI20092620 filed on 22 Jun. 2009, the contents of each of which are incorporated herein, in their entirety, by this reference.

FIELD OF INVENTION

The present invention relates to carbon blacks-free sulfur-vulcanised electrically conductive rubber blends prepared by using a practical and environmentally friendly method, i.e. the high temperature-mechanical mixing.

BACKGROUND OF INVENTION

As reported by U.S. Pat. No. 7,351,359 and Yong K. C. et al in his journal paper [*European Polymer Journal*, 2006], a non-practical and non-environmentally friendly method, i.e. the solution mixing [involved using of large quantity of hazardous chemical solvents, e.g. chloroform, xylene, toluene and etc, in order to dilute both poly(butadiene-co-acrylonitrile) and sulfonic acid doped polyaniline] had been used to prepare this type of non-vulcanised electrically conductive rubber blends. This was due to the great difficulty of direct dispersing of solid sulfonic acid doped polyaniline within the solid poly(butadiene-co-acrylonitrile) host matrix. Therefore, a more practical and environmentally friendly method (with a quicker mixing period and without using any hazardous chemical solvents) needs to be introduced for the purpose of preparing this type of sulfur-vulcanised electrically conductive rubber blends. Apart from this, a type of chemical additive is also needed here in order to allow the direct dispersion and to enhance the dispersing level of solid sulfonic acid doped polyaniline within the solid poly(butadiene-co-acrylonitrile) host matrix.

SUMMARY OF THE INVENTION

Accordingly, the present invention provides a solid sulfonic acid doped polyaniline electrically conductive filler with protonation level of between 40 to 100%, the filler is synthesised using aniline monomer with a purity level of 99±2 weight %, oxidant with a purity level of 99±2 weight %, first doping agent with a purity level of 36 to 38 weight %, catalyst with a purity level of 99±2 weight %, dedoping agent with a purity level of 30 to 34 weight % and second doping agent with a purity level of 68 to 72 weight %.

Furthermore, the present invention also provides an electrically conductive sulfur-vulcanised rubber blend, the blend contains 50.0 to 99.0 p.p.h.r. of solid poly(butadiene-co-acrylonitrile) with 17 to 54 weight % of acrylonitrile contents, 1.0 to 50.0 p.p.h.r, of solid sulfonic acid doped polyaniline electrically conductive filler with protonation level of 40-100%, dispersing agent of solid sulfonic acid doped polyaniline electrically conductive filler (which has been prepared and premixed with 60 to 80 weight % of zinc oxide and 20 to 40 weight % of dopant) with 2 to 4 times total weight % of the total content of solid sulfonic acid doped polyaniline electrically conductive filler, 0.5±0.05 p.p.h.r. of an antioxidant with a purity level of 95-100 wt %, 0.5±0.05 p.p.h.r. of sulfur with a purity level of 95-100 wt %, 3.5±0.1 p.p.h.r. of sulfur vulcanisation system's accelerator with a purity level of 95-100 wt %, 7.0±0.4 p.p.h.r. of sulfur vulcanisation system's activator with a purity level of 95-100 wt % and 1.0 to 5.0 p.p.h.r. of a whitening agent with a purity level of 90-100 wt %.

Finally, the present invention also provides a process for preparing sulfur-vulcanised electrically conductive poly (butadiene-co-acrylonitrile)-sulfonic acid doped polyaniline blends, the process includes a high temperature-mechanical mixing by using an internal mixing device at a temperature of between 120 to 230° C., fill factor of between 0.60 to 0.80 and rotors speed of between 80-120 rounds per minute and a two-roll open milling device at a temperature of between 30-120° C.

The present invention consists of several novel features and a combination of parts hereinafter fully described and illustrated in the accompanying description and drawings, it being understood that various changes in the details may be made without departing from the scope of the invention or sacrificing any of the advantages of the present invention.

BRIEF DESCRIPTION OF THE DRAWINGS

The present invention will be fully understood from the detailed description given herein below and the accompanying drawings which are given by way of illustration only, and thus are not limitative of the present invention, wherein.

DETAILED DESCRIPTION OF THE PREFERRED EMBODIMENTS

Figure 1:
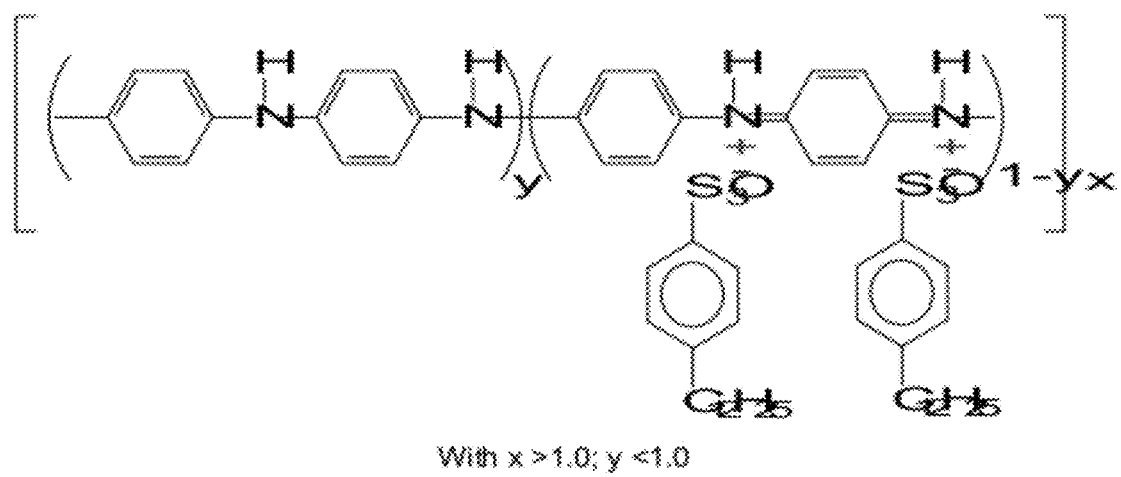
FIG. 1 illustrates the basic chemical structure of the smallest repeat unit of a sulfonic acid doped polyaniline example, i.e. the polyaniline dodecylbenzenesulfonate.
Figure 2:
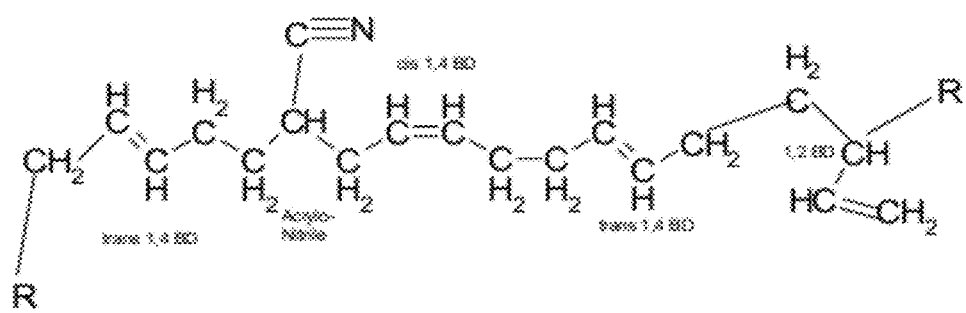
FIG. 2 illustrates the preferable example of the molecular chemical structure of poly(butadiene-co-acrylonitrile)
Figure 3:
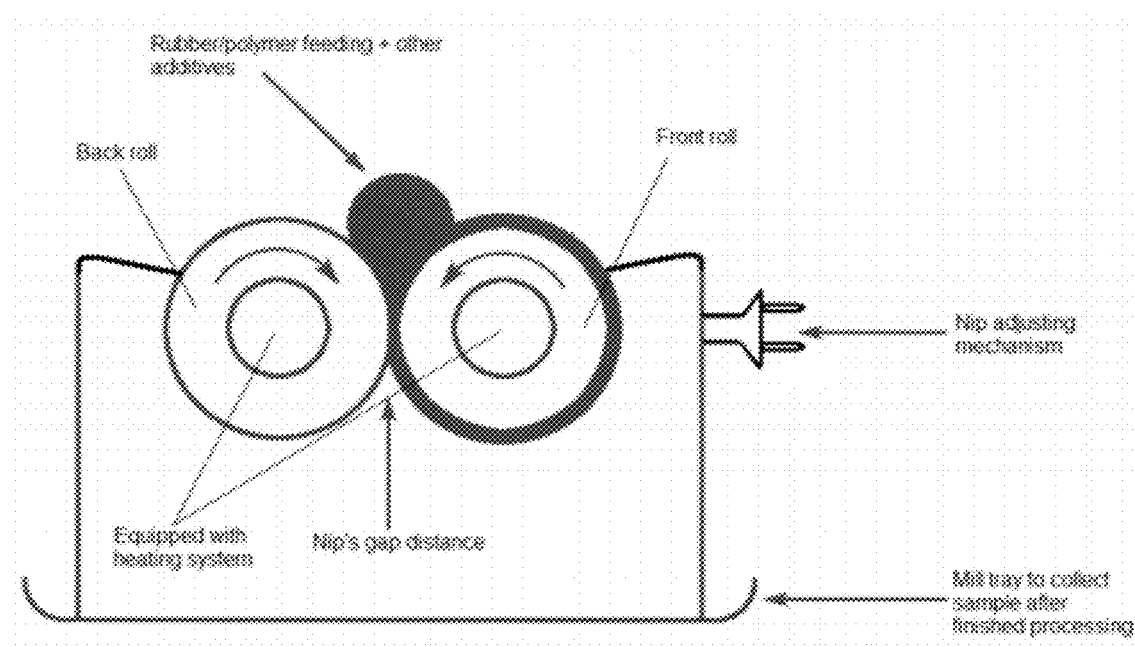
FIG. 3 illustrates the general 2-dimensional anatomical view of the main structures for a two-roll open milling device.

The present invention relates to carbon blacks-free sulfur-vulcanised electrically conductive rubber blends. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

The present invention describes a practical and environmentally friendly method (i.e. the high temperature-mechanical mixing) on how to prepare the carbon blacks-free sulfur-vulcanised electrically conductive rubber blends. All sulfur-vulcanised electrically conductive rubber blends in this present invention are based on poly(butadiene-co-acrylonitrile) [also known as nitrile rubber] as the rubber host and sulfonic acid doped polyaniline as the only electrically conductive filler. These two major constituent polymers are known to be highly processable with the help of introduction of a special formulated dispersing agent for the sulfonic acid doped polyaniline filler in solid form. All sulfur-vulcanised electrically conductive rubber blends in this present invention are also colourable with the inclusion of whitening agents.

In view of the great difficulty of direct dispersing of solid sulfonic acid doped polyaniline within the solid poly(butadiene-co-acrylonitrile) host matrix, it is now able to demostrate that the very high conductivities of the sulfur-vulcanised poly (butadiene-co-acrylonitrile)-sulfonic acid doped polyaniline blends (reaching at the order of $10^{-2}$ S/cm) can be produced by using the high temperature-mechanical method (i.e. with an internal mixing device and a two-roll open milling device), which is a much more practical and environmentally friendly method if compared to the prior utilised solution mixing method. A special formulated dispersing agent is also introduced to the materials in order to enhance the processability and dispersion level of the solid sulfonic acid doped polyaniline within the solid poly(butadiene-co-acrylonitrile) host matrixs.

This type of sulfur-vulcanised electrically conductive rubber blend is also obtained from a carbon blacks-free formulation. In other words, it can help to promote a cleaner and healthier (non-black) production/working environment. Potential commercial applications (such as for antistatic products, electrostatic dissipating or discharging products and electromagnetic or radio frequency interferences shielding products) with more interesting visual appearance (i.e. the ability to be incorporated with different colouring agents due to the inclusion of whitening agent into the rubber blend) can also be manufactured using this type of vulcanised rubber blend. Suitable methods for processing this type of vulcanised rubber blend are including various types of rubber processing equipment, such as injection moulding, extrusion and hot press-moulding.

Poly(butadiene-co-acrylonitrile)-sulfonic acid doped polyaniline blend masterbatches with different compositions of poly(butadiene-co-acrylonitrile), sulfonic acid doped polyaniline, zinc compound and tetrakis-(methylene-(3,5-diterbutyl-4-hydrocinnamate) methane are prepared by using a temperature controllable internal mixing device (at temperature 120-230° C., fill factor 0.60 to 0.80 and rotors speed at 80-120 rounds per minute).

Sulfur vulcanisation system agents, which including. sulfur, sulfur vulcanisation system's accelerator, and sulfur vulcanisation system's activator are added later to the poly(butadiene-co-acrylonitrile)-sulfonic acid doped polyaniline blend masterbatches by using a pre-warmed (at temperature 30-120° C.) two-roll open milling device in order to avoid the premature vulcanisation problem that can cause hardening and reducing the processability of the produced blend masterbatches. Whitening agent is also added to each of the blend masterbatches by using the two-roll open milling device.

All sulfur-vulcanised poly(butadiene-co-acrylonitrile)-sulfonic acid doped polyaniline blends [including 1 to 50 p.p.h.r. of solid sulfonic acid doped polyaniline electrically conductive fillers] prepared by using the high temperature-mechanical mixing exhibit good electrical conductivities (with the range of order from $10^{-2}$-$10^{-11}$ S/cm) and good tensile properties (with tensile strengths 6.0 to 18.0 MPa).

Mixing proportions and function of each of the main chemicals, raw materials and processing equipment that are used to produce the sulfur-vulcanised poly(butadiene-co-acrylonitrile)-sulfonic acid doped polyaniline blends are listed as following:

Aniline monomer (purity 99±2 wt %), antioxidant (purity 99±2 wt %), hydrochloric acid [HCl] solution (36-38 wt %, as the first doping agent), anhydrous metallic chloride (purity 99±2 wt %, as the catalyst), ammonia solution (30-34 wt %, as the dedoping agent) and 68-72 wt % of sulfonic acid solution (as the second doping agent) are used to synthesis the solid sulfonic acid doped polyaniline with protonation level 40-100%.

1 to 50 p.p.h.r. of solid sulfonic acid doped polyaniline with protonation level at 40-100% (as synthesised using procedures described in the Example 1) are used as the only electrically conductive fillers.

From hereinbelow, the preferred embodiments of the present invention will be discussed in relation to the accompanying FIGS. 1 to 4, which will be used independently or in any combination thereof.

A special formulated (includes 60 to 80 weight % of zinc oxide and 20 to 40 weight % of dopant, i.e. sulfonic acid) and premixed (with a mechanical mixer, at temperature below 300° C.) dispersing agent is applied here as the solid sulfonic acid doped polyaniline conductive filler's dispersion agent. Its general compounding proportion is two to four times of the total weight percentage of solid sulfonic acid doped polyaniline content for each blend.

50.0-99.0 p.p.h.r. of solid poly(butadiene-co-acrylonitrile), also known as nitrile rubber [any grades with 17 to 54 weight % of acrylonitrile contents] are used as the solid rubber host.

0.5±0.05 of sulfur, 3.5±0.1 p.p.h.r. of sulfur vulcanisation system's accelerator and 7.0±0.4 sulfur vulcanisation system's activator [all with purity, 95-100 wt %] are used as the ingredients of the sulfur system vulcanisation purpose for all solid poly(butadiene-co-acrylonitrile)-sulfonic acid doped polyaniline blends.

0.5±0.05 p.p.h.r. of antioxidant [purity 95-100 wt %] is included into all blends in the hope to enhance their oxidation resistance.

1.0-5.0 p.p.h.r. of whitening agent [purity 90-100 wt %] are included into all solid poly(butadiene-co-acrylonitrile)-sulfonic acid doped polyaniline blends in order to bring out or enhance the colours of the blends when any types of colouring agent are included.

Two-roll open milling device is a general rubber processing device, which includes of main structures, i.e. a pair of counter-rotating rollers in an open system and is equipped with a heating system in order to control the rollers surfaces temperature. Size of the device is varied and depends on the amount of material that is processed.

Internal mixing device is a general rubber or polymer processing device, which includes of some main structures in a closed system, i.e. a controllable moving (up and down movements) ram, a pair of rotating rotors (with controllable rotating speed) and equipped with a heating system in order to control the mixing chamber's temperature. Size of the device is varied and depends on the amount of material that is processed.

Example 1

Preparation of 50±2 Grams of Polyaniline Dodecylbenzenesulfonate (with Protonation Level, 48%) as the Electrically Conductive Filler in Dry Solid Form Synthesis of Polyaniline-Emeraldine Base:

Hydrochloric acid [HCl] doped polyaniline is synthesised by oxidative chemical polymerisation. 50 mL of aniline (monomer, 99 wt %) is dissolved in 375 mL of 2 molar [M] HCl and pre-cooled to 1° C. Based on the value of oxidant/monomer initial mole ratio (r) equal to 1.0, the solution of oxidant is prepared by dissolving 125.2 g ammonium persulphate (99 wt %) with 276 mL of 2M HCl and pre-cooled to 1° C. The oxidant solution is added gradually to the monomer solution over a period of 20±2 minutes, with constant stirring by an overhead stirrer to ensure thorough mixing. The addition of oxidant can cause a sudden increase in temperature. A few drops of anhydrous ferric chloride solution (99 wt %) are added to the polymerisation mixture as a catalyst. The polymerisation mixture is maintained at temperature about 0 to 2° C. with constant stirring in an ice bath, while the pH is adjusted to about 0 to 1 by adding a small amount of concentrated HCl. The mixture is left for 6 hours to complete the polymerisation. The mixture is then filtered and washed with 1500 mL of 2M HCl. The colour of the filtrate is reddish-pink due to the presence of soluble aniline oligomers. The mixture is washed with distilled water until the filtrate is colourless. To prepare polyaniline-emeraldine base, wet HCl doped polyaniline is deprotonated with a five times excess of ammonia (5000 mL of ammonia aqueous solution is prepared from 80 mL of 33 wt % ammonia) and is stirred for 24 hours. The resultant mixture is filtered and then washed with distilled water until the filtrate is colourless and no odour of ammonia can be detected. Wet polyaniline-emeraldine base is later washed with 750 mL of acetone [purity 99 wt %] for purification, before being finally dried in a vacuum oven (at 50° C.) until constant weight is obtained.

Doping of Polyaniline-Emeraldine Base:

Polyaniline dodecylbenzenesulfonate is prepared by protonating the pre-dried polyaniline-emeraldine base with aqueous solution of dodecylbenzenesulfonic acid (70 weight % in 2-propanol) at a molar ratio of polyaniline-emeraldine base:dodecylbenzenesulfonic acid of 1:1 for 24 hours under constant magnetic stirring. The resulted product [solid polyaniline dodecylbenzenesulfonate, with protonation level at 48%] is filtered and then washed with small quantities of distilled water. The resulted product [solid polyaniline dodecylbenzenesulfonate, with protonation level at 48%] is remained under suction by vacuum pump until cracks are started to appear. A further 24 hours drying of the resulted product is carried out in a vacuum oven at 50° C. The dry solid polyaniline dodecylbenzenesulfonate (with protonation level at 48%) has electrical conductivity at 1.2±0.2 S/cm (as measured by using Van der Pauw 4-probe method).

Example 2

Figure 4:
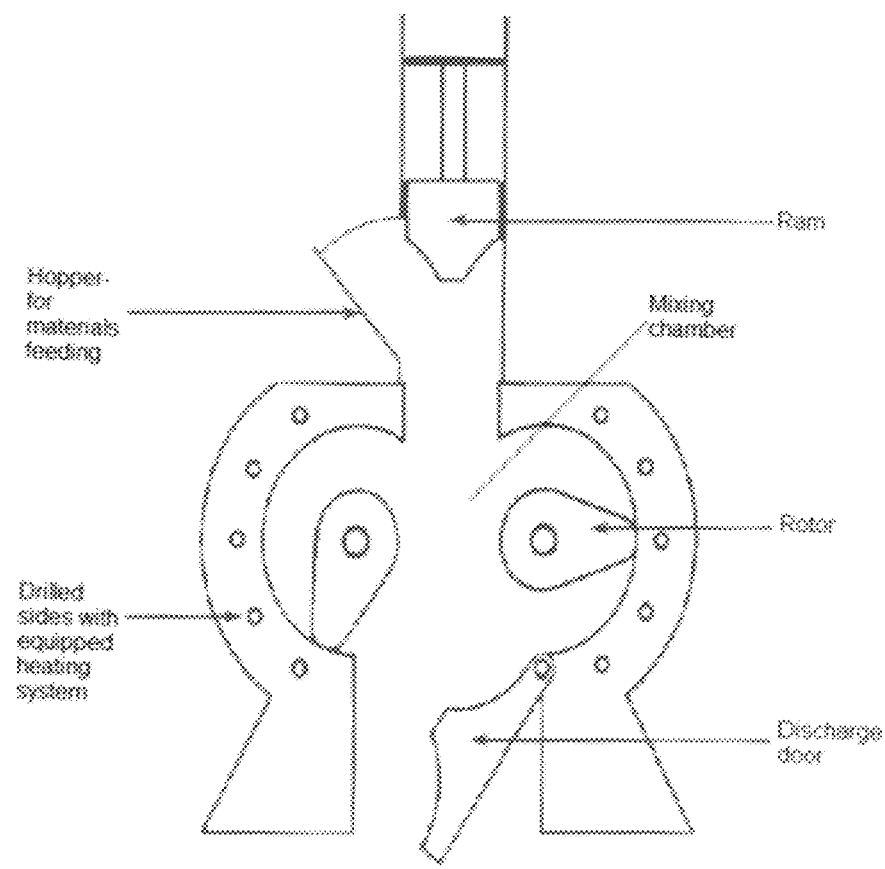
FIG. 4 illustrates the general 2-dimensional anatomical view of the main structures for an internal mixing device.

Preparation of Sulfur Vulcanisation System Containing Poly(Butadiene-Co-Acrylonitrile)-Polyaniline Dodecylbenzenesulfonate Blend Masterbatches Poly(butadiene-co-acrylonitrile)-polyaniline dodecylbenzenesulfonate blend masterbatches with different compositions [in parts per hundred rubber, p.p.h.r.] of poly(butadiene-co-acrylonitrile) [grade with 48 weight % of acrylonitrile contents, with electrical conductivity in the order of $\times 10^{-14}$ S/cm]: polyaniline dodecylbenzenesulfonate [with protonation level, 48%, prepared as described in Example 1], i.e. 99:1, 97.5:2.5, 95:5, 92.5:7.5, 90:10, 80:20, 70:30, 60:40 and 50:50 are prepared by using an internal mixing device as illustrated by FIG. 4. A fill factor of 0.70 (from the total free volume of an internal mixing device's mixing chamber) is used to perform all mixings. The starting temperature for each mixing is 150° C. The rotor speed is 100 r.p.m. Stages of each mixing are as described in Table 1:

TABLE 1

Stages of Preparation of Sulfur Vulcanisation System Containing Poly(butadiene-co-acrylonitrile)-Polyaniline Dodecylbenzenesulfonate Blend Masterbatches by using An Internal Mixing Device

| Stage of mixing | Timing |
| --- | --- |
| 1. Addition of poly(butadiene-co-acrylonitrile) | $0^{th}$ minute |

TABLE 1-continued

Stages of Preparation of Sulfur Vulcanisation System Containing Poly(butadiene-co-acrylonitrile)-Polyaniline Dodecylbenzenesulfonate Blend Masterbatches by using An Internal Mixing Device

| Stage of mixing | Timing |
| --- | --- |
| 2. Addition of polyaniline dodecylbenzenesulfonate and dispersing agent | $1^{st}$ minute |
| 3. Addition of tetrakis-methylene-(3,5-di-terbutyl-4-hydrocinnamate) methane | $3^{rd}$ minute |
| 4. Sweeping | $4^{th}$ minute |
| 5. Dumping | $10^{th}$ minute (Total time = 10 minutes) |

A special formulated dispersing agent (prepared with 60 weight % of zinc oxide and 40 weight % of dodecylbenzenesulfonic acid; premixed in a mechanical mixer at temperature 170° C.) is applied as the solid polyaniline dodecylbenzenesulfonate conductive filler's dispersion agent. Its compounding proportion is three times of the total weight percentage of solid polyaniline dodecylbenzenesulfonate conductive filler's content for each blend. It is added to each of the blends by using the internal mixing device (see FIG. 1) with procedures as described by Table 1. 0.5 p.p.h.r. of tetrakis-methylene-(3,5-di-terbutyl-4-hydrocinnamate) methane (as the antioxidant) is also added to each of the poly(butadiene-co-acrylonitrile)-polyaniline dodecylbenzenesulfonate blend masterbatches during the mixing (as described by Table 1). 4.0 p.p.h.r. of titanium dioxide (as the whitening agent), 0.5 p.p.h.r of sulfur, 3.5 p.p.h.r. of benzothiazole disulfide (as the vulcanisation system's accelerator), 5.0 p.p.h.r of zinc oxide and 2.0 p.p.h.r. of stearic acid (both as the vulcanisation system's activators) are added to each of the poly(butadiene-co-acrylonitrile)-polyaniline dodecylbenzenesulfonate blend masterbatches (with 1 to 50 p.p.h.r. of polyaniline dodecylbenzenesulfonate) on a pre-warmed (temperature at 50° C.) two-roll open milling device (with the nip's gap distance is adjusted to 2±0.2 mm). Each of the sulfur vulcanisation system containing poly(butadiene-co-acrylonitrile)-polyaniline dodecylbenzenesulfonate blend masterbatches is then removed from the two-roll open milling device after 15 minutes of total mixing period. Prolonged mixing can cause premature vulcanisation due to the heat energy generated through surface friction between the materials and rollers.

Example 3

Preparation of Sulfur-Vulcanised Poly(Butadiene-Co-Acrylonitrile)-Polyaniline Dodecylbenzenesulfonate Blends Each of the sulfur vulcanisation system containing poly (butadiene-co-acrylonitrile)-polyaniline dodecylbenzenesulfonate blend masterbatches as prepared on the two-roll open milling device (as described in Example 2) is immediately used while it is still warm. Appropriate amounts (is varied with the targeted application) of each of the sulfur vulcanisation system containing poly(butadiene-co-acrylonitrile)-polyaniline dodecylbenzenesulfonate blend masterbatches are cut and fed into a mould (dimension of the mould is also varied with the type of targeted application). The mould together with the sulfur vulcanisation system containing poly(butadiene-co-acrylonitrile)-polyaniline dodecylbenzenesulfonate blend are sent for curing (with heating temperature 180±2° C. and duration based on the $T_{c90}$ (curing time to at least 90% of curing level) of each blend (as measured by a Mooney's moving die typed rheometer) are reported in Table 2.

TABLE 2

$T_{c90}$ (Curing Time to at least 90% of Curing Level) of Sulfur Vulcanisation System Containing Poly(butadiene-co-acrylonitrile)-Polyaniline Dodecylbenzenesulfonate Blends (Cured at Temperature, 180 ± 2° C.)

| Blend [poly(butadiene-co-acrylonitrile): polyaniline dodecylbenzenesulfonate] (p.p.h.r.) | $T_{c90}$ (±0.05 minute) |
|---|---|
| 99:1.0 | 17.10 |
| 97.5:2.5 | 16.57 |
| 95:5.0 | 14.13 |
| 92.5:7.5 | 11.54 |
| 90:10 | 10.87 |
| 80:20 | 10.37 |
| 70:30 | 10.25 |
| 60:40 | 10.14 |
| 50:50 | 10.02 |

Example 4

Electrical and Tensile Properties of the Sulfur-Vulcanised Poly(Butadiene-Co-Acrylonitrile)-Polyaniline Dodecylbenzenesulfonate Blends Sulfur-vulcanised poly(butadiene-co-acrylonitrile)-polyaniline dodecylbenzenesulfonate blends prepared by using the high temperature-mechanical mixing (as described in Example 3) have the orders of electrical conductivity (measured using Van der Pauw 4-probes method) as summarised in Table 3, which rendered the material suitable for various applications, such as for the electromagnetic or radio frequency interferences shielding, electrostatic dissipative or discharging and antistatic purposes.

TABLE 3

Orders of Electrical Conductivity (in the unit of S/cm) for Sulfur-Vulcanised-Poly(butadiene-co-acrylonitrile)-Polyaniline Dodecylbenzenesulfonate Blends

| Blend [poly(butadiene-co-acrylonitrile): polyaniline dodecylbenzenesulfonate] (p.p.h.r.) | Electrical Conductivity Order (S/cm) |
|---|---|
| 99:1.0 | $\times 10^{-11}$ |
| 97.5:2.5 | $\times 10^{-10}$ |
| 95:5.0 | $\times 10^{-8}$ |
| 92.5:7.5 | $\times 10^{-7}$ |
| 90:10 | $\times 10^{-6}$ |
| 80:20 | $\times 10^{-4}$ |
| 70:30 | $\times 10^{-3}$ |
| 60:40 | $\times 10^{-2}$ |
| 50:50 | $\times 10^{-2}$ |

Sulfur-vulcanised poly(butadiene-co-acrylonitrile)-polyaniline dodecylbenzenesulfonate blends prepared by using the high temperature-mechanical mixing (as described in Example 3) also have some main non-aged tensile properties (measured according to the standard, i.e. BS ISO 37-2005) as shown in Table 4.

TABLE 4

Non-Aged Tensile Properties of Sulfur-Vulcanised-Poly(butadiene-co-acrylonitrile)-Polyaniline Dodecylbenzenesulfonate Blends

| Blend [poly(butadiene-co-acrylonitrile):polyaniline dodecylbenzenesulfonate] (p.p.h.r.) | Tensile Strength (MPa) | Elongation at Break (%) |
|---|---|---|
| 99:1.0 | 10.6 ± 0.5 | 790.3 ± 30.0 |
| 97.5:2.5 | 11.8 ± 0.5 | 720.9 ± 30.0 |
| 95:5.0 | 13.9 ± 0.5 | 625.3 ± 30.0 |
| 92.5:7.5 | 17.1 ± 0.5 | 540.0 ± 30.0 |
| 90:10 | 14.1 ± 0.5 | 342.8 ± 30.0 |
| 80:20 | 12.2 ± 0.5 | 273.7 ± 30.0 |
| 70:30 | 10.3 ± 0.5 | 200.5 ± 30.0 |
| 60:40 | 8.4 ± 0.5 | 125.3 ± 30.0 |
| 50:50 | 6.8 ± 0.5 | 102.5 ± 30.0 |

The invention claimed is:

1. An electrically conductive sulfur-vulcanised rubber blend, the electrically conductive sulfur-vulcanised rubber blend comprising:
   50.0 to 99.0-p.p.h.r. of solid poly(butadiene-co-acrylonitrile) with 17 to 54 weight % of acrylonitrile contents;
   1.0 to-50.0 p.p.h.r. of solid sulfonic acid doped polyaniline electrically conductive filler with a protonation level of 40-100%;
   a dispersing agent of solid sulfonic acid doped polyaniline electrically conductive filler, which has been prepared and premixed with 60 to 80 weight % of zinc oxide and 20 to 40 weight % of dopant, with 2 to 4 times total weight % of the total content of the solid sulfonic acid doped polyaniline electrically conductive filler;
   about 0.5 p.p.h.r. of an antioxidant with a purity level of 95-100 wt %;
   about 0.5 p.p.h.r. of sulfur with a purity level of 95-100 wt %; about 3.5 p.p.h.r. of sulfur vulcanisation system's accelerator with a purity level of 95-100 wt %;
   about 7.0 p.p.h.r. of sulfur vulcanisation system's activator with a purity level of 95-100 wt %; and
   from about 1.0 p.p.h.r. to about 20.0 p.p.h.r. of a whitening agent with a purity level of 90-100 wt %.

2. The electrically conductive sulfur-vulcanised rubber blend as claimed in claim 1, wherein the premix of 60 to 80 weight % of zinc oxide and 20 to 40 weight % of sulfonic acid are used as the dispersing agent of the solid sulfonic acid doped polyaniline electrically conductive filler.

3. The electrically conductive sulfur-vulcanised rubber blend as claimed in claim 2, wherein the premix of zinc oxide and sulfonic acid is prepared by using a mechanical mixer at a temperature below 300° C. and are used as the dispersing agent of the solid sulfonic acid doped polyaniline electrically conductive filler.

4. The electrically conductive sulfur-vulcanised rubber blend as claimed in claim 1, exhibiting an electrical conductivity in a range between $10^{-2}$-$10^{-11}$ S/cm and a tensile strength of between 6.0 to 18.0 MPa.

5. The electrically conductive sulfur-vulcanised rubber blend as claimed in claim 1, wherein the electrically conductive sulfur-vulcanised rubber blend is colourable with an inclusion of a whitening agent with a purity level of 90-100 wt %.

6. The electrically conductive sulfur-vulcanised rubber blend as claimed in claim 1, wherein the electrically conductive sulfur-vulcanised rubber blend is used to manufacture products for antistatic, electrostatic discharge or dissipative and electromagnetic or radio frequency interferences shielding purposes.

7. A process for preparing the electrically conductive sulfur-vulcanised rubber blend as claimed in claim 1, wherein the process includes a high temperature-mechanical mixing by using an internal mixing device at a temperature of between 120 to 230° C., fill factor of between 0.60 to 0.80 and rotors speed of between 80-120 rounds per minute and a two-roll open milling device at a temperature of between 30-120° C.

8. The process as claimed in claim 7, wherein the blends exhibit electrical conductivities in the range of between $10^{-2}$-$10^{-11}$ S/cm and tensile properties with tensile strengths of between 6.0 to 18.0 MPa.

9. The process as claimed in claim 7, wherein the electrically conductive sulfur-vulcanised rubber blend are colourable with an inclusion of a whitening agent with a purity level of 90-100 wt %.

10. The process as claimed in claim 7, wherein the electrically conductive sulfur-vulcanised rubber blend is used to manufacture products for antistatic, electrostatic discharge or dissipative and electromagnetic or radio frequency interferences shielding purposes.

\* \* \* \* \*

UNITED STATES PATENT AND TRADEMARK OFFICE
CERTIFICATE OF CORRECTION

PATENT NO.       : 8,679,375 B2
APPLICATION NO.  : 13/542251
DATED            : March 25, 2014
INVENTOR(S)      : Yong et al.

It is certified that error appears in the above-identified patent and that said Letters Patent is hereby corrected as shown below:

In the Specification

Column 1
Line 25, change "et al" to --et al.--
Line 28, change "toluene" to --toluene,--
Line 27, change "of large quantity" to --a large quantity--
Line 29, change "and etc," to --etc.--
Line 49, change "with protonation" to --with a protonation--
Line 51, change "between 40 to 100%, the filler" to --between 40 to 100%. The filler--
Line 58, change "contains" to --containing--

Column 2
Line 10, change "includes" to --including--
Line 13, change "rotors speed" to --rotor speed--
Line 61, change "of introduction" to --of the introduction--

Column 3
Line 9, change "special formulated" to --specially formulated--
Line 13, change "matrixs" to --matrixes--
Line 24, change "of whitening" to --of a whitening--
Line 27, change "are including" to --include--
Line 33, change "zinc compound" to --a zinc compound--
Line 36, change "rotors speed" to --rotor speed--
Line 38, change "which including. sulfur" to --which include sulfur--
Line 45, change "reducing" to --reduce--

Column 4
Line 9, change "special formulated" to --specially formulated--
Line 30-31, change "are included" to --is included--

Signed and Sealed this
Second Day of June, 2015

Michelle K. Lee
*Director of the United States Patent and Trademark Office*

CERTIFICATE OF CORRECTION (continued)
U.S. Pat. No. 8,679,375 B2

Line 35, change "Two-roll" to --A two-roll--
Line 36, change "includes of main structures" to --includes as main structures--
Line 38, change "rollers surfaces" to --rollers' surface--
Line 41, change "Internal mixing" to --An internal mixing--
Line 42, change "of some main structures" to --as some main structures--

Column 5
Line 3, change "at temperature about" to --at a temperature of about--
Line 11, change "prepare" to --prepare a--
Line 23, change "aqueous solution" to --an aqueous solution--
Line 31-32, change "cracks are started" to --cracks start--

Column 6
Line 16, change "special formulated" to --specially formulated--
Line 38, change "distance is adjusted" to --distance adjusted--
Line 67, change "C." to --C.)--

In the Claims

Column 9
Line 14, Claim 9, change "are colourable" to --is colourable--